Figure 1:
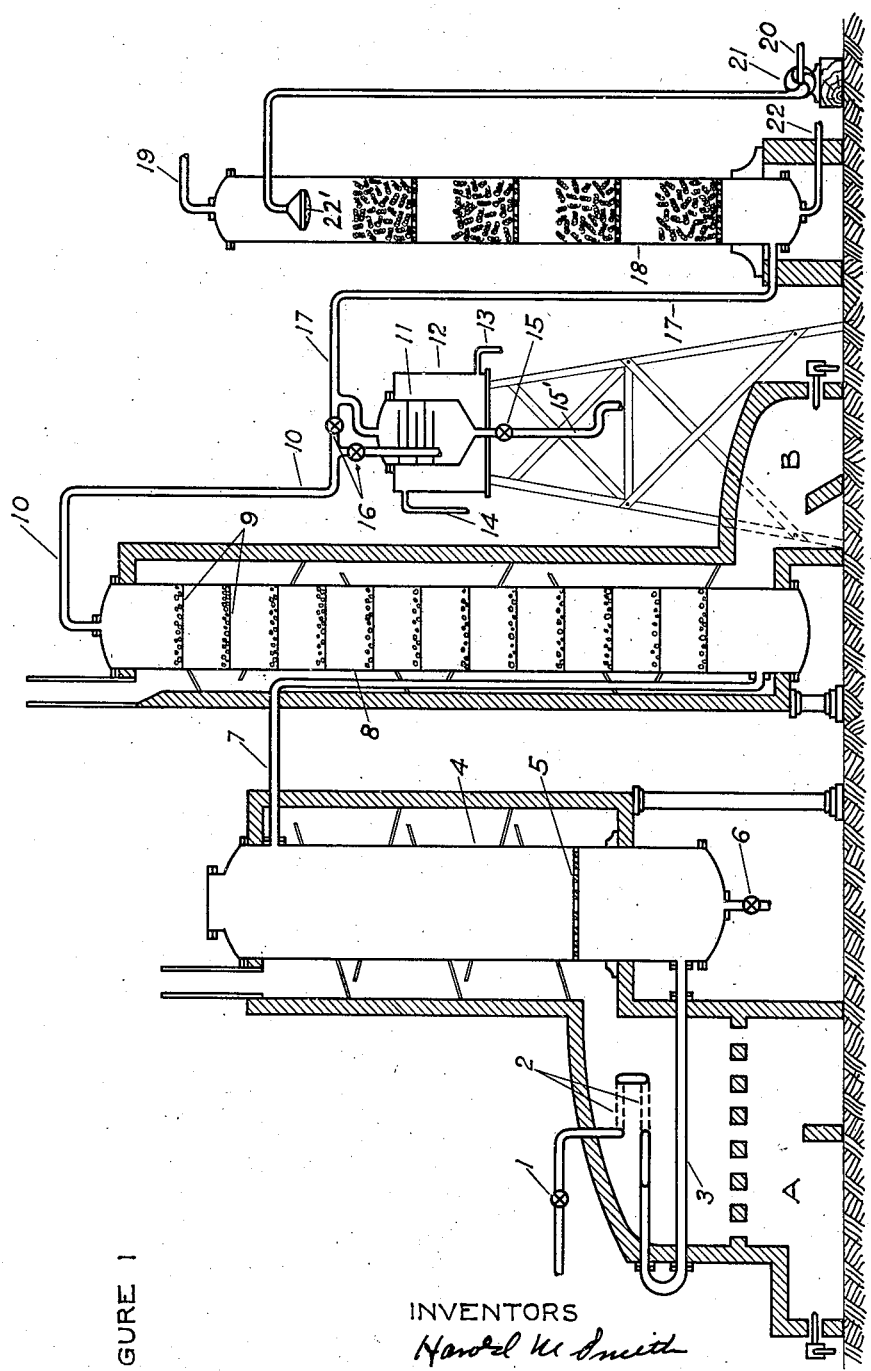

March 26, 1935. H. M. SMITH ET AL 1,995,329
PROCESS FOR TREATING GASEOUS HYDROCARBONS
Filed Oct. 31, 1932   2 Sheets-Sheet 1

INVENTORS
Harold M. Smith
Harry T. Rall
BY Thos. J. McMullen
ATTORNEY

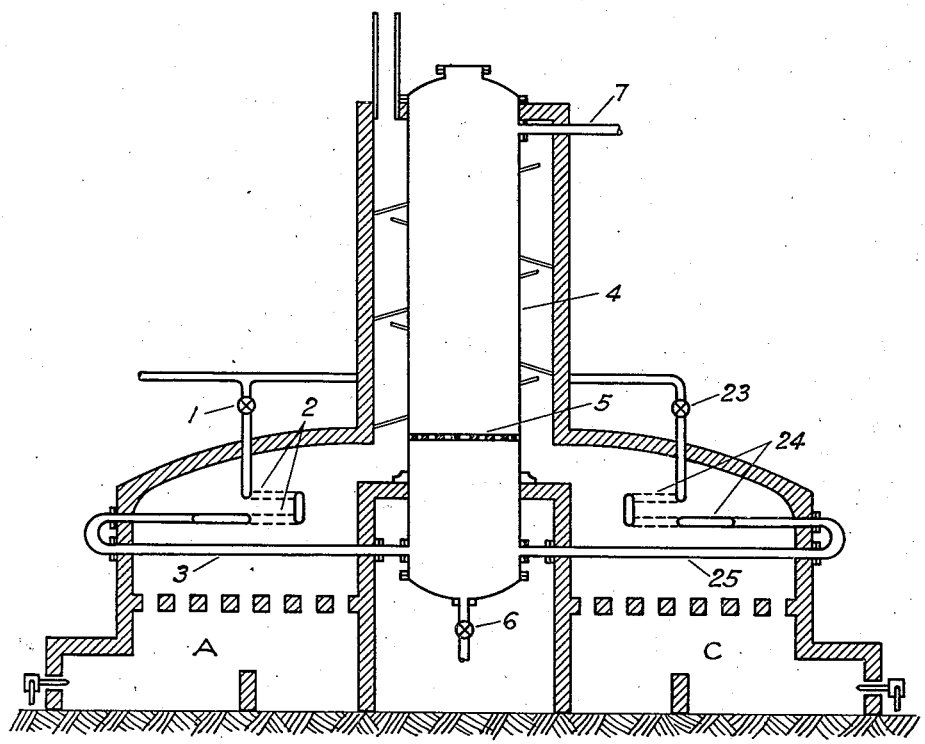

Patented Mar. 26, 1935

1,995,329

UNITED STATES PATENT OFFICE 1,995,329

PROCESS FOR TREATING GASEOUS HYDROCARBONS

Harold M. Smith and Harry T. Rall, Bartlesville, Okla.

Application October 31, 1932, Serial No. 640,508

10 Claims. (Cl. 260—168)

REISSUED

SEP 2 - 1941

(Granted under the act of March 3, 1883, as amended April 30, 1928; 370 O. G. 757)

This invention described herein may be manufactured and used by or for the Government for governmental purposes, without the payment to us of any royalty thereon.

The present invention generically relates to thermal decomposition processes and constitutes an improvement of the process described and claimed in pending application for a Process of treating hydrocarbons, Serial No. 629,734, filed August 19, 1932, more particularly it is directed to a method and apparatus whereby saturated gaseous hydrocarbons are converted to useful liquid and gaseous products.

One object of this invention is to provide an improved method and apparatus for converting gaseous hydrocarbons, typified by methane, ethane, propane, butane and iso-butane, either collectively or separately, into products valuable as motor fuels, solvents or organic intermediates.

Another object of this invention is to provide a method and apparatus by which a considerable portion of the tars, formed concurrently with the light oils in the thermal decomposition of natural gases and which heretofore have been considered of no value, may be converted into useful liquids.

Another object of this invention is to provide a method and apparatus whereby a large portion of the hydrogen, which is of necessity formed by the thermal breakdown of the paraffin hydrocarbons, may be utilized in the hydrogenation of the tarry materials resulting from such thermal treatment, thus preparing the gas for more efficient recycling.

Another object of this invention resides in the provision of a method and apparatus for effecting hydrogenation of the gaseous unsaturated hydrocarbons formed by the thermal breakdown of the gas being processed so that the residue gas is more suitable for recycling.

With these and other objects in view this invention resides in the novel details of construction, combination and arrangement of parts to be more particularly hereinafter set forth and claimed.

Briefly stated, this invention consists in heating gases to a temperature sufficient to crack the hydrocarbons, the velocity of the gas stream being regulated to provide optimum yield of secondary products and hydrogen, directing the heated gases into a condensing chamber having therein absorbent material, the temperature within the chamber being maintained within a predetermined temperature range to extract by condensation and absorption the heavier portions of the tar, removing the light oils while still in a vapor state from the condensing chamber, passing them over a hydrogenating catalyst at a definite temperature and velocity and then extracting the liquid products formed.

Referring more particularly to the accompanying drawings in which corresponding parts are indicated by similar reference characters:

Fig. 1 is a diagrammatic view, partially in section, partially in elevation, the several units utilized in the process forming the subject matter of this application being shown in operative association; and Fig. 2 is a transverse vertical section, partially in elevation, illustrating the dual heating arrangement for the heating coils.

In general we propose to heat saturated gaseous hydrocarbons, typified by methane, ethane, propane, butane and iso-butane, either at atmospheric or elevated pressures, to such a temperature that a large yield of liquid products, such as benzene, is obtained together with a considerable yield of tarry material. While still in a gaseous condition the pyrolyzed mixture is passed directly through a suitably heated condensing and absorbing chamber for extracting by condensation and absorption certain of the heavier undesirable tarry products. The residual gases and lower constituents of the tars are next passed over a hydrogenating catalyst under such conditions that the unsaturated gaseous hydrocarbons and the polynuclear hydrocarbons are hydrogenated by the hydrogen present in the gas stream. Useful condensable products are next removed from the gas and the residue gases treated for the removal of other desirable gaseous constituents, recycled, or burned as fuel to supply heat to the process.

In their efforts to devise and improve processes for the conversion of natural gas or its components to commercially valuable substances such as anti-knock motor fuels and solvents, research workers have been handicapped in attaining their ultimate objective by the concurrent formation of considerable quantities of tarry material whenever maximum yields of useful liquid products have been approached. In order to overcome this difficulty, inherent in the thermal decomposition of gaseous hydrocarbons, various devices have been resorted to; for example, it has been proposed to convert the saturated gas into its corresponding olefine, and subsequently polymerize this product under suitable conditions. However, here again, efficient polymerization is always accompanied by copious production of tarry materials. Another device, which has been suggested, is the addition of a diluent gas such as nitrogen. While this goes far toward accomplishing the desired restriction of tar formation, it is obviously not always possible or feasible to provide sufficient amounts of the diluent gas. It is therefore the aim and purpose of this invention to provide a simple and inexpensive process by which large yields of useful products may be obtained which will overcome the difficulties mentioned above.

Coming now to a more detailed discussion of the application of the process under consideration, the gaseous mixture to be processed, which may be natural gas hydrocarbons, pressure still gases, oil gases, etc., are directed to a reaction tube, where the incoming gases are heated as rapidly as possible to a temperature sufficient to crack the hydrocarbon molecules and form fragments or free radicals. This is best carried out at temperatures ranging from 700 to 1200° C. The time of contact in this reaction tube should be sufficient so that a yield of light oil is obtained approaching the maximum amount obtainable in a single pass for the gas being processed. If conditions have been correctly adjusted, this yield of light oil will be accomplished by an approximately equal yield of semi-liquid tar.

As the next step in the process the entire gaseous mixture as it leaves the reaction tube with all the light oil and tar in the vapor state, is passed through a condensing chamber filled with a material of an absorptive nature. This absorptive material serves to retain the undesirable portions of the tar allowing only the desirable constituents to pass. It may consist of cotton, charcoal, shredded asbestos, or any similar material, it being simply necessary to maintain specific temperatures for each material depending upon the object desired. For example, assuming that it is desired that only naphthalene and lower constituents should pass through, the proper temperature for each of the above materials should be approximately as follows: cotton, 100–150° C.; charcoal, 500–600° C.; shredded asbestos, 100–150° C.

In place of the purifying chamber just referred to a Cottrell precipitator, not shown, may be resorted to. With this type of precipitator a gaseous mixture is directed through an electrical field established between two electrodes suitably arranged in a gas conduit, the electrical field will extract liquid particles but permit the gases to pass through. When this form of apparatus is utilized the naphthalene and lower constituents are reduced to a gaseous form and consequently pass through the electrical field while the undesirable products are extracted.

The final step in the process consists in passing the desired gases and vapors into a catalyst chamber containing a hydrogenating catalyst maintained at such a temperature that the unsaturated hydrocarbons and the polynuclear aromatic constituents of the tar are hydrogenated by utilization of the hydrogen previously formed in the cracking operation.

For instance, if the gas which is passed to the hydrogenating chamber consists principally of ethylene, acetylene, methane and hydrogen, together with benzene and naphthalene vapors, the following reactions will take place in the presence of a nickel catalyst maintained at 200° C., where the gas has a space velocity of 34 seconds at atmospheric pressure:

$$C_2H_2 + 2H_2 \rightarrow C_2H_6$$
$$C_2H_4 + H_2 \rightarrow C_2H_6$$
$$C_{10}H_8 + 4H_2 \rightarrow C_{10}H_{12}$$

The preceding reactions will proceed with equal advantage at any temperature between 100 to 300° C., provided the space velocity is proportionally adjusted to correspond to the temperature range.

The reactions indicated are exothermic and suitable provisions must be made for controlling the temperature of the hydrogenating chamber. It should be noted that when reactions such as the above take place in addition to valuable products being formed, considerable hydrogen is removed from the gas, which improves its value for recycling purposes. Experiments have shown that dilution with hydrogen seriously retards the formation of light oils in the termal decomposition of saturated hydrocarbons. Furthermore, for fuel purposes the desirability of the gas is also enhanced, since the removal of the hydrogen increases the heating value of the gas.

The whole of the gaseous mixture, consisting of fixed gases and vapors is next passed into a recovery system, consisting of a suitable arrangement of coolers, scrubbers, or other appropriate devices, for separating the components of the gaseous mixture. The particular apparatus and arrangement used for this purpose may be varied considerably dependent upon the nature of the products to be recovered, and the ultimate disposition of the residue gas.

The process as described above functions admirably at atmospheric pressure but it is understood that we do not limit ourselves to this pressure as certain of the reactions involved are greatly accelerated by elevated pressures. Static experiments have shown that up to somewhat over an atmosphere of hydrogen pressure, the initial velocity of the reaction is approximately proportional to the square of the initial hydrogen pressure. Suitable initial hydrogen pressures which are dependent upon the extent of cracking, may be obtained at any total pressure from atmospheric to at least 100 lbs. per square inch. Thus it is evident this process is entirely feasible over a pressure range of at least 1 to 100 lbs. per square inch with pressures in the higher range more advantageous.

Reference will now be made to Figs. 1 and 2 of the drawings which show one form of apparatus successfully employed in the process forming the subject matter of this application. The gas to be processed after being metered at the desired pressure, is admitted through valve (1) to the preheating coils (2) located in the cooler portion of the heating zone of furnace A. It is then returned through the zone of highest heat of furnace A, in the reaction tube (3), from which it is passed as directly as possible into the bottom of tower (4), where a portion of the tar may condense and be withdrawn through valve (6).

Tower (4) is packed from the perforated plate (5), to a region near its upper end with an absorptive material serving to retain the undesirable condensed portions of the tar and allowing only the desirable constituents to pass through, as previously discussed. The gas after its passage through tower (4), is led through line (7) into the bottom of a second heated tower (8), located in a furnace B containing hydrogenating catalysts (9).

In this tower the unsaturated gases, such as acetylene and ethylene, are converted to saturated hydrocarbons by the action of the hydrogen present in the gas generated in the cracking tube. At the same time the naphthalene contained in the gas is converted to tetrahydronaphthalene. Benzene, however, remains unchanged and passes with the exit gases out of the tower through line (10).

Should it be desirable to effect an incomplete separation of the heavy liquids, such as tetrahydronaphthalene, from the lighter, such as benzene, the gas stream may be diverted by means of proper regulation of the valves (16), into the receiver (11). This is simply a condensing chamber surrounded by container (12) through which cold water may be circulated, the water entering container (12) through line (13) and leaving through outlet (14); condensed liquids in the chamber are withdrawn through conduit (15') and valve (15) to a suitable storage receptacle.

The residue gas from this incomplete separation is now carried through line (17) into the bottom of scrubbing tower (18), where it is denuded of all its light oil. Tower (18) may conform to the well known standard forms of equipment designed for this purpose but is preferably a pressure absorption tower using as a solvent tetrahydronaphthalene.

Fresh solvent enters the tower through line (20) and by means of pump (21) is sprayed into the top of the tower through appropriate nozzle (22') from whence it passes to the bottom of the tower in counter-current flow to that of the gas. All light oils are thus removed from the gas which is finally taken from the tower through line (19) from which it may be further treated for the removal of other gaseous hydrocarbons, burned as fuel, or recycled.

The wash oil is removed from tower (18) through line (22) from which it is conducted to appropriate apparatus (not shown) for removing the dissolved light oil, and returned to the tower.

Pumps, valves and auxiliary equipment (not shown) may be conveniently located at strategic positions along the line of flow so that any desirable pressure can be maintained in any or all portions of the system, as will be readily understood without further discussion.

It is well known that the speed of a chemical reaction is proportional to the concentration of one of the reactants and in the case of the reaction:

$$C_{10}H_8 + 2H_2 \rightarrow C_{10}H_{12}$$

We have demonstrated in the laboratory that this reaction in the vapor phase proceeds with an approximate velocity directly proportional to the concentration of the hydrogen. Therefore, while it is obvious that theoretically more than sufficient hydrogen will always be produced in the cracking chamber to hydrogenate all the naphthalene and unsaturated hydrocarbons present in the gas, nevertheless it may become desirable to increase the concentration in order that this reaction might proceed with greater ease and shorter contact time.

The preceding object may be attained without materially affecting the quality or quantity of the yield of liquid products by resorting to an auxiliary furnace C and cracking tube, such as that shown in Fig. 2 of the drawings, wherein (25) is the auxiliary cracking tube into which gas may be led through valve (23) and preheater (24). It is clear that the extent of cracking can easily be controlled either by varying the temperature of the tube or the velocity of the gas through the tube so that a small amount of gas can be caused to produce a pyrolyzed gas extremely rich in hydrogen. This gas when mixed with the relatively large amount of gas coming from the reaction tube (3), which, it is understood, is operating on a basis of optimum production of benzene and naphthalene, will supply any additional hydrogen which might be necessary.

The gas from the two reaction tubes (3) and (25) are brought together in the bottom of purifying tower (4) where they are thoroughly mixed prior to ascending the tower. The volume of gas from the reaction tube (3) is large and rich in liquids and naphthalene while the volume of gas from reaction tube (25) is small and rich in hydrogen. The treatment of the combined gases after their mixture is identical to that previously described in the discussion of Fig. 1.

In concluding it may be stated that a dry gas of the following composition; methane, 66.4%; ethane, 3.7%; propane, 1.8%; butane, 1.3%; and the remainder inert gases was processed in an apparatus as described with the following yields of liquid products; 50 gallons of heavy liquids consisting mainly of tetrahydronaphthalene and 300 gallons of light oils consisting mainly of benzene, per million cubic feet of gas. The residue gas, stripped of liquids, contained 60.0% saturated hydrocarbons, 17.5% hydrogen and the remainder inert gases. There were no unsaturated gases. In this particular example the cracking conditions were severe, leading, naturally to an excessive production of hydrogen.

Although in the foregoing certain elements have been described as best adapted to perform the functions allotted to them, nevertheless it is to be understood that certain changes may be resorted to without departing from or sacrificing any of the principles of this invention.

Having described our invention, what we claim as new and wish to secure by Letters Patent is:

1. A process for converting gaseous paraffin hydrocarbons into light oils by thermal decomposition and catalytic hydrogenation, consisting in cracking the gases within a definite temperature range and at a pressure and velocity to limit secondary reactions and provide an optimum yield of aromatic hydrocarbons, extracting by condensation and absorption the higher heavy constituents of the tars produced by the endothermic reactions, directing the residual gases and lower constituents of the tars into a catalytic hydrogenation chamber, causing the gases to traverse metallic catalyst in the presence of hydrogen at a predetermined temperature, pressure and velocity and then directing the gases from the hydrogenation chamber into a recovery system for the purpose of extracting the light oils.

2. A process for converting gaseous paraffin hydrocarbons into light oils by thermal decomposition and catalytic hydrogenation, consisting in cracking the gases within a definite temperature range and at a pressure and velocity to limit secondary reactions and provide an optimum yield of aromatic hydrocarbons, extracting by condensation and absorption the higher heavy constituents of the tars produced by the endothermic reactions, directing the residual gases and lower constitutents of the tars into a catalytic hydrogenation chamber, causing the gases to traverse metallic catalyst in the presence of hydrogen at a definite pressure and velocity and within a temperature range of 100 to 300° C.

3. A process for treating gaseous paraffin hydrocarbons by thermal decomposition and catalytic hydrogenation consisting in cracking the gases within a temperature range and at a pressure and velocity which will limit secondary reactions and provide an optimum yield of aromatic hydrocarbons, directing the heated gases into a condensing and absorption chamber having therein an absorbing material, limiting the temperature of the condensing chamber to a definite temperature range to extract by condensation and absorption the heavier portions of the tars, removing the purified light oils and desirable constituents of the tars while still in the vapor state from the condensing chamber, passing them over a hydrogenating catalyst at a definite temperature, pressure and velocity and then extracting the liquid products formed.

4. A process for treating gaseous paraffin hydrocarbons by thermal decomposition and catalytic hydrogenation, consisting in cracking the gases within a temperature and pressure range and at a velocity which will limit secondary reactions and provide an optimum yield of aromatic hydrocarbons and hydrogen, directing the heated gases into a condensing chamber having an absorbent material therein, the dimensions of such condensing chamber being such as to materially reduce the velocity of the gaseous flow, limiting the condensing chamber to a temperature range of 100 to 600° C., whereby to extract by condensation and absorption, the heavier undesirable portions of the tars, removing the purified light oils and desirable constituents of the tars while still in the vapor state from the condensing chamber, passing them over a hydrogenating catalyst at a definite temperature, pressure and velocity and then extracting the liquids formed.

5. A process for treating gaseous paraffin hydrocarbons by thermal decomposition and catalytic hydrogenation, consisting in cracking the gases within a temperature and pressure range and at a velocity to limit secondary reactions and provide an optimum yield of aromatic hydrocarbons and hydrogen, directing the heated gases into a condensing chamber having an absorbent material therein, the dimensions of such chamber being such as to materially reduce the velocity of the gaseous flow, limiting the condensing chamber to a temperature of 100 to 600° C., whereby to extract by condensation and absorption the undesirable heavier portions of the tars, removing the purified light oils and desirable constituents of the tars while still in the vapor state from the condensing chamber, passing them over a hydrogenating catalyst at a predetermined space velocity and at a temperature between 100 to 300° C., and then extracting the liquid products formed.

6. A process for treating gaseous paraffin hydrocarbons by thermal decomposition and catalytic hydrogenation, consisting in heating the gases under pressure sufficient to crack the hydrocarbons, restricting the pressure to 1–100 pounds per square inch, regulating the velocity of the gas stream so as to limit secondary reactions and provide an optimum yield of aromatic hydrocarbons and hydrogen, directing the heated gases into a condensing chamber having therein an absorbent material, the dimensions of said chamber being such as to materially reduce the velocity of the gaseous flow, limiting the condensing chamber to a temperature range of 100 to 600° C., whereby to extract by condensation and absorption the heavier portions of the tars, removing the purified light oils and desirable constituents of the tars while still in the vapor state, passing them over a hydrogenating catalyst at a temperature range of 100 to 300° C., and with a space velocity sufficient to hydrogenate the products and then extracting the liquid products formed.

7. A process for treating gaseous paraffin hydrocarbons by thermal decomposition and catalytic hydrogenation, consisting in cracking the gases under control conditions of temperature, pressure and velocity to limit secondary reactions and provide an optimum yield of aromatic hydrocarbons, and hydrogen, augmenting the heated gases with a gas rich in hydrogen, directing the mixture of heated gases into a condensing chamber having therein an absorbent material and limited to a temperature range of 100 to 600° C., whereby to extract the undesirable heavier portions of the tars, removing the purifying light oils and desirable constituents of the tars while still in a vapor state from the condensing chamber and passing them over a hydrogenating catalyst at a temperature range of 100 to 300° C., and with a space velocity sufficient to hydrogenate the products and then extracting the liquid products formed.

8. A process for treating gaseous paraffin hydrocarbons by thermal decomposition and catalytic hydrogenation, consisting in cracking the gases within definite temperature and pressure ranges and at a velocity to limit secondary reactions and provide an optimum yield of aromatic hydrocarbons and hydrogen, directing the heated gases into a condensing and absorption chamber under control conditions of velocity and temperature, whereby to extract by condensing and absorption the heavier portions of the tars, removing the purified light oils and desirable constituents of the tars while still in a vapor state from the condensing chamber and passing them over a hydrogenating catalyst under predetermined conditions of temperature, pressure and spaced velocity and then extracting the liquid products formed.

9. A process for treating gaseous paraffin hydrocarbons by thermal decomposition and catalytic hydrogenation, consisting in cracking the gases within definite temperature and pressure ranges and at a velocity to limit secondary reactions and provide an optimum yield of aromatic hydrocarbons and hydrogen, directing the heated gases into a condensing and absorption chamber under control conditions of velocity and temperature, whereby to extract by condensing and absorption the heavier portions of the tars, removing the purified light oils and desirable constituents of the tars while still in a vapor state from the condensing chamber and passing them over a hydrogenating catalyst under predetermined conditions of temperature, pressure, spaced velocity and catalytic activity, and then extracting the liquid products formed.

10. A process for the production of tetrahydronaphthalene by the thermal decomposition of gaseous paraffin hydrocarbons followed by the subsequent catalytic hydrogenation of the naphthalene formed, consisting in heating gases within a pressure range of 1—100 pounds per square inch to such a temperature that a maximum amount of naphthalene is formed, directing the heated gases and vapors into a condensing and absorption chamber under controlled conditions of velocity and temperature, whereby to extract by condensation and absorption the heavier portions of the tars, removing the hot gases and naphthalene while still in a vapor state from the condensing chamber, passing them over a hydrogenating catalyst under such conditions of temperature, pressure, space velocity and catalyst activity that the naphthalene is converted to tetrahydronaphthalene and then directing the vapors through a condensing system to separate the tetrahydronaphthalene.

HAROLD M. SMITH.
HARRY T. RALL.